(12) United States Patent
Lu

(10) Patent No.: US 12,495,110 B2
(45) Date of Patent: Dec. 9, 2025

(54) CONTROL HANDLE ASSEMBLY

(71) Applicant: DEXIN CORPORATION, New Taipei (TW)

(72) Inventor: Ho-Lung Lu, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 18/945,536

(22) Filed: Nov. 13, 2024

(65) Prior Publication Data

US 2025/0071198 A1    Feb. 27, 2025

Related U.S. Application Data

(63) Continuation-in-part of application No. 18/458,115, filed on Aug. 29, 2023.

(60) Provisional application No. 63/644,610, filed on May 9, 2024.

(30) Foreign Application Priority Data

May 19, 2023  (TW) ................... 112118604
Jul. 15, 2024  (TW) ................... 113126360

(51) Int. Cl.
| | |
|---|---|
| *G06F 1/16* | (2006.01) |
| *A63F 13/24* | (2014.01) |
| *G06F 3/01* | (2006.01) |
| *G06F 3/038* | (2013.01) |
| *H04M 1/04* | (2006.01) |
| *H04M 1/72409* | (2021.01) |
| *H04M 1/72427* | (2021.01) |

(52) U.S. Cl.
CPC ......... *H04M 1/72427* (2021.01); *A63F 13/24* (2014.09); *G06F 1/1632* (2013.01); *G06F 3/016* (2013.01); *G06F 3/038* (2013.01); *H04M 1/04* (2013.01); *H04M 1/72409* (2021.01)

(58) Field of Classification Search
CPC ...................................... G06F 3/016
See application file for complete search history.

(56) References Cited

U.S. PATENT DOCUMENTS

2012/0302347 A1* 11/2012 Nicholson ............. A63F 13/428
                                                                 463/37
2016/0317919 A1* 11/2016 Gassoway ............... A63F 13/98
(Continued)

*Primary Examiner* — Nan-Ying Yang
(74) *Attorney, Agent, or Firm* — Li & Cai Intellectual Property Office

(57) ABSTRACT

A control handle assembly is used for holding a portable electronic device. The control handle assembly includes a handle body, a control module, and two handle auxiliary accessories. The handle body includes a connection mechanism and two gripping parts, and the connection mechanism and the two gripping parts can jointly hold the portable electronic device. Each of the handle auxiliary accessories is fixed on a side of each of the gripping parts, and a second electrically connecting structure of each of the handle auxiliary accessories is connected to a first electrically connecting member of each of the gripping parts. A vibration module is disposed in an accessory body of the handle auxiliary accessory. When the control module is connected to the portable electronic device, the control module controls the vibration module to vibrate according to a control signal transmitted by the portable electronic device.

15 Claims, 7 Drawing Sheets

(56) References Cited

U.S. PATENT DOCUMENTS

2021/0252383 A1* 8/2021 VanWyk .................. G06F 3/165
2021/0252386 A1* 8/2021 VanWyk .................. A63F 13/24

* cited by examiner

CONTROL HANDLE ASSEMBLY

CROSS-REFERENCE TO RELATED PATENT APPLICATION

This application claims the benefit of priorities to Taiwan Patent Application No. 112118604, filed on May 19, 2023, the U.S. Provisional Patent Application Ser. No. 63/644,610, filed on May 9, 2024, and Taiwan Patent Application No. 113126360, filed on Jul. 15, 2024. The entire content of each of the above identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a control handle assembly, and more particularly to a control handle assembly provided for holding a portable electronic device.

BACKGROUND OF THE DISCLOSURE

Most conventional control handles for holding a smartphone or a tablet do not have a vibration function. If the control handle does not have the vibration function, a user has a poor experience.

After being used by the user for a long time, the conventional control handle for holding the smartphone or the tablet is likely to have an increased temperature, such that palms of the user are prone to sweating. When the user has sweaty palms, the user will have difficulty in properly gripping the control handle, thereby leading to the problem of the control handle easily slipping out of a hand of the user.

SUMMARY OF THE DISCLOSURE

In response to the above-referenced technical inadequacies, the present disclosure provides a control handle assembly for effectively improving the problems associated with a conventional control handle for holding a smartphone or a tablet, such as not having a vibration function and easily causing palms of a user to be covered in sweat due to an increased temperature of the conventional control handle after a long time use.

In order to solve the above-mentioned problems, one of the technical aspects adopted by the present disclosure is to provide a control handle assembly, which is used for holding a portable electronic device. The control handle assembly includes a handle body, a control module, and two handle auxiliary accessories. The handle body includes a connection mechanism and two gripping parts. Two ends of the connection mechanism are connected to the two gripping parts, and the connection mechanism and the two gripping parts are configured to jointly hold the portable electronic device. A plurality of operation members are disposed on one side of each of the two gripping parts, and a first electrically connecting member and at least one first connecting member are disposed on another side of each of the two gripping parts. The control module is disposed in the handle body. Each of the two handle auxiliary accessories includes an accessory body, at least one second connecting member, a second electrically connecting structure, and a vibration module. The at least one second connecting member is disposed on the accessory body. The at least one second connecting member and the at least one first connecting member are detachably connected to each other. The second electrically connecting structure is disposed on the accessory body. The vibration module is disposed in the accessory body and is electrically connected to the second electrically connecting structure. In each of the two handle auxiliary accessories, when the at least one second connecting member and the at least one first connecting member are connected to each other, and the second electrically connecting structure and the first electrically connecting member are connected to each other, the vibration module is electrically connected to the control module through the second electrically connecting structure and the first electrically connecting member. When the control module is electrically connected to the vibration module of each of the two handle auxiliary accessories, and the control module is connected to the portable electronic device, the control module is configured to control the vibration module of each of the two handle auxiliary accessories to vibrate according to a control signal that is transmitted by the portable electronic device.

In order to solve the above-mentioned problems, another one of the technical aspects adopted by the present disclosure is to provide a control handle assembly, which is used for holding a portable electronic device. The control handle assembly includes a handle body, a control module, and two handle auxiliary accessories. The handle body includes a connection mechanism and two gripping parts. Two ends of the connection mechanism are connected to the two gripping parts, and the connection mechanism and the two gripping parts are configured to jointly hold the portable electronic device. A plurality of operation members are disposed on one side of each of the two gripping parts, and a first electrically connecting member and at least one first connecting member are disposed on another side of each of the two gripping parts. The control module is disposed in the handle body. Each of the two handle auxiliary accessories includes an accessory body, at least one second connecting member, a second electrically connecting structure, and a heat-dissipating module. The at least one second connecting member is disposed on the accessory body. The at least one second connecting member and the at least one first connecting member are detachably connected to each other. The second electrically connecting structure is disposed on the accessory body. The heat-dissipating module is disposed in the accessory body, and is electrically connected to the second electrically connecting structure. In each of the two handle auxiliary accessories, when the at least one second connecting member and the at least one first connecting member are connected to each other, and the second electrically connecting structure and the first electrically connecting member are connected to each other, the heat-dissipating module is electrically connected to the control module through the second electrically connecting structure and the first electrically connecting member. When the control module is connected to the heat-dissipating module of each of the two handle auxiliary accessories, and the control module is connected to the portable electronic device, the control module is configured to start the heat-dissipating module of each of the two handle auxiliary accessories so as to a temperature of the accessory body is lower than or equal to a predetermined temperature.

Therefore, in the control handle assembly provided by the present disclosure, the control handle assembly can provide the user with a better use experience by including the vibration module in the handle auxiliary accessory. In addition, the control handle assembly can facilitate hear dissipation of the palms of the user by including the heat-dissipating module in the handle auxiliary accessory, so that the palms of the user are less likely to sweat, and the user can obtain a better use experience.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
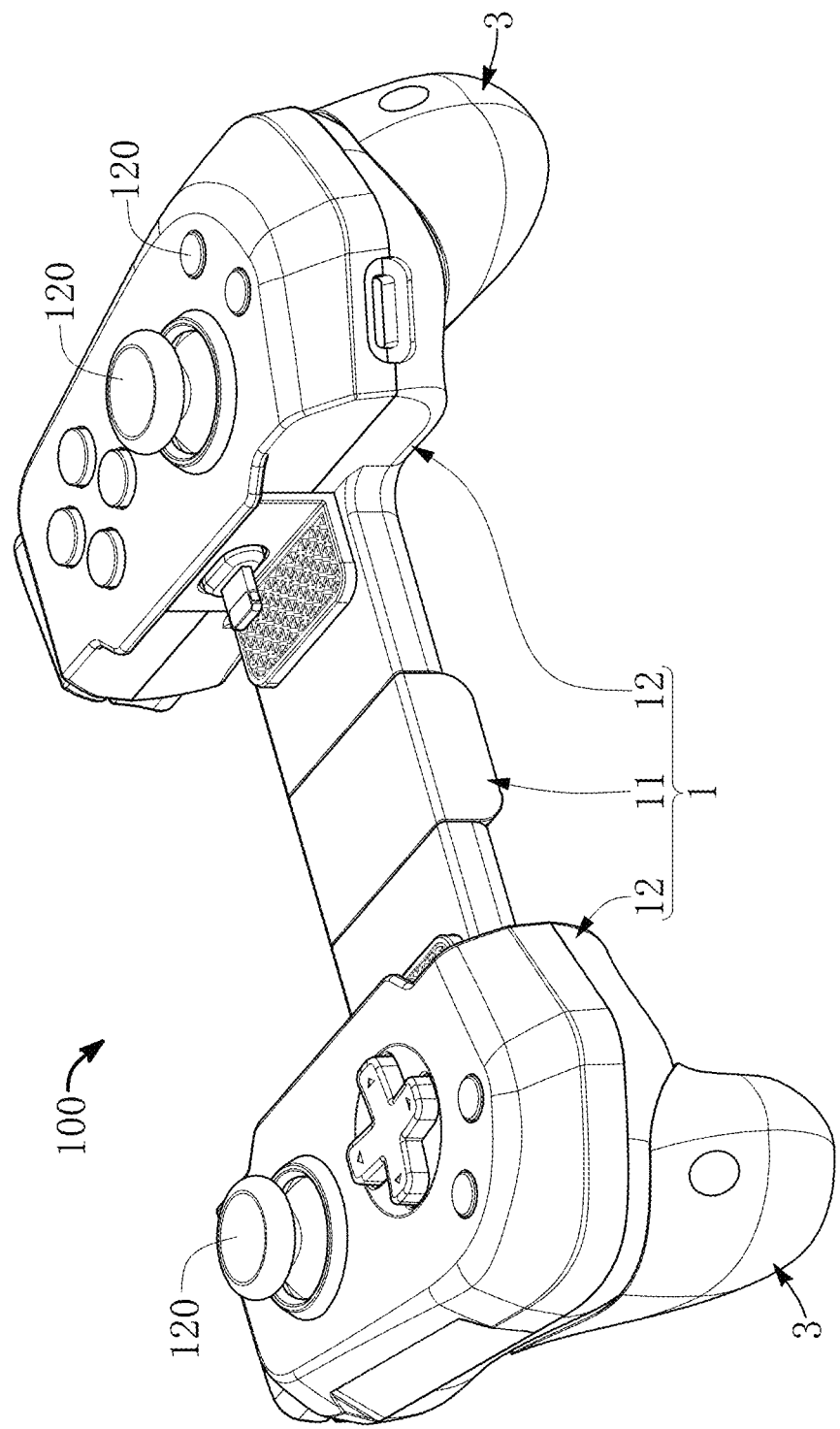
FIG. 1 is a schematic perspective view of a control handle assembly according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
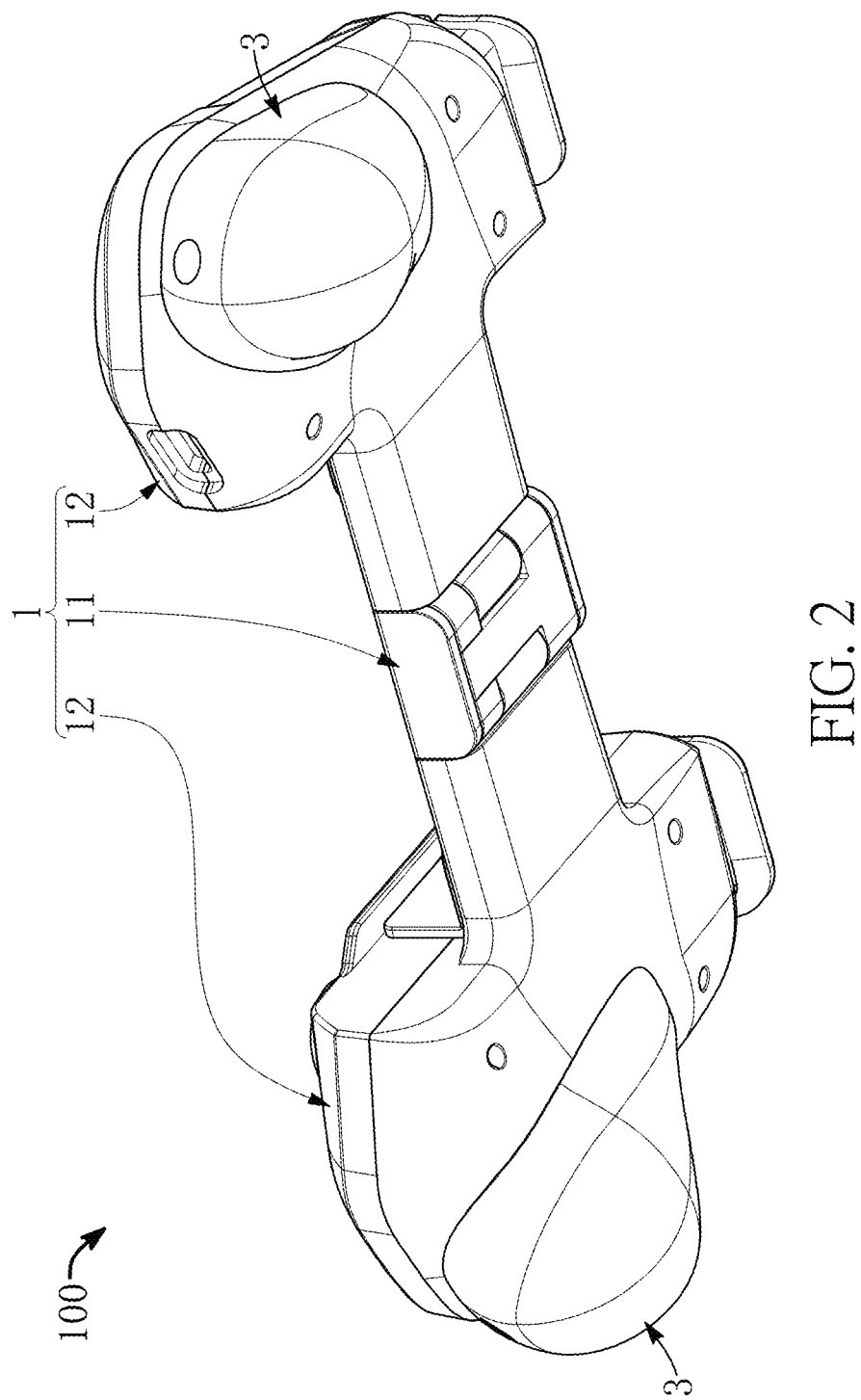
FIG. 2 is a schematic perspective view of the control handle assembly from another perspective of FIG. 1.
Figure 3:
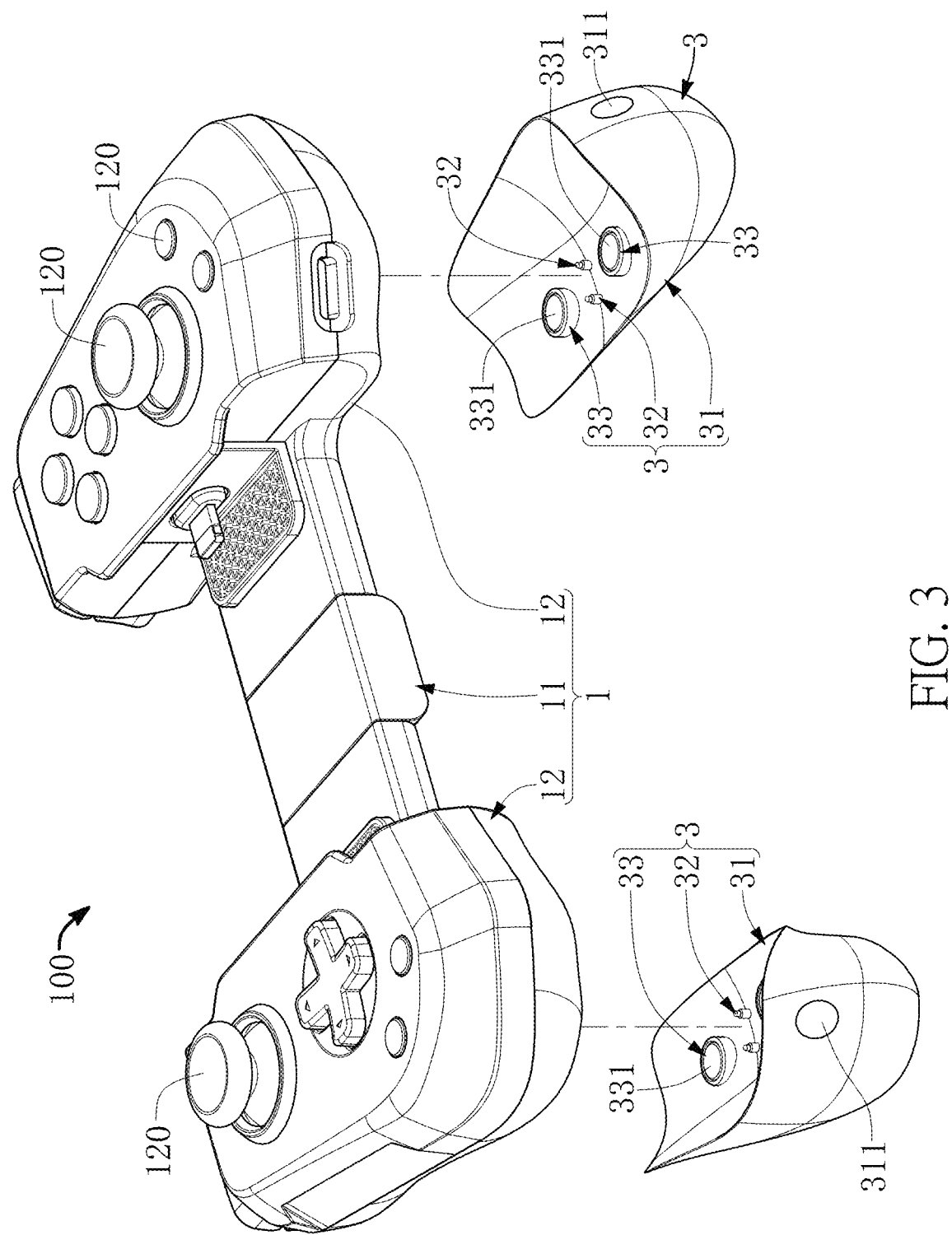
FIG. 3 is a schematic exploded view of the control handle assembly according to the present disclosure.
Figure 4:
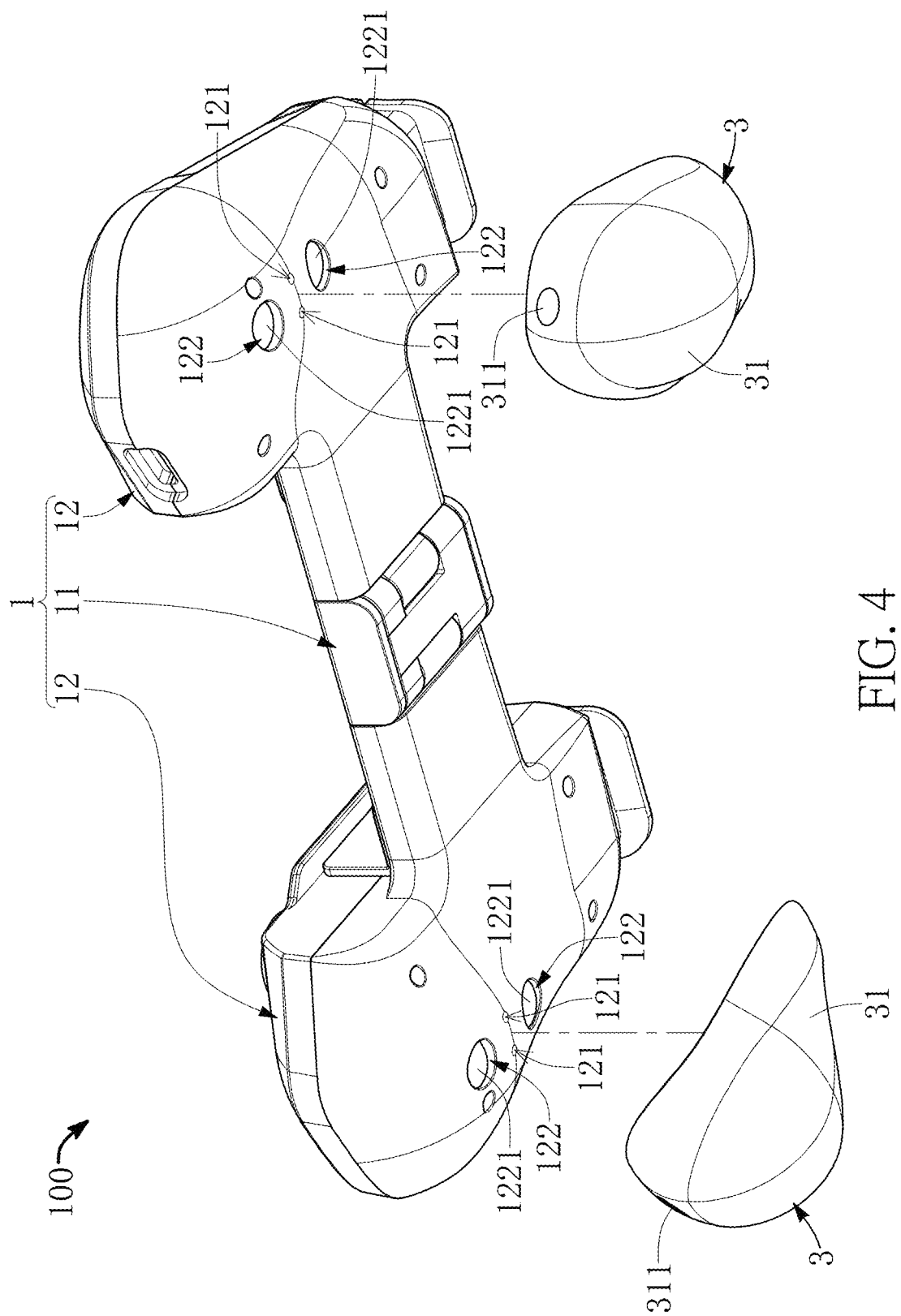
FIG. 4 is a schematic exploded view of the control handle assembly from another perspective of FIG. 3.
Figure 5:
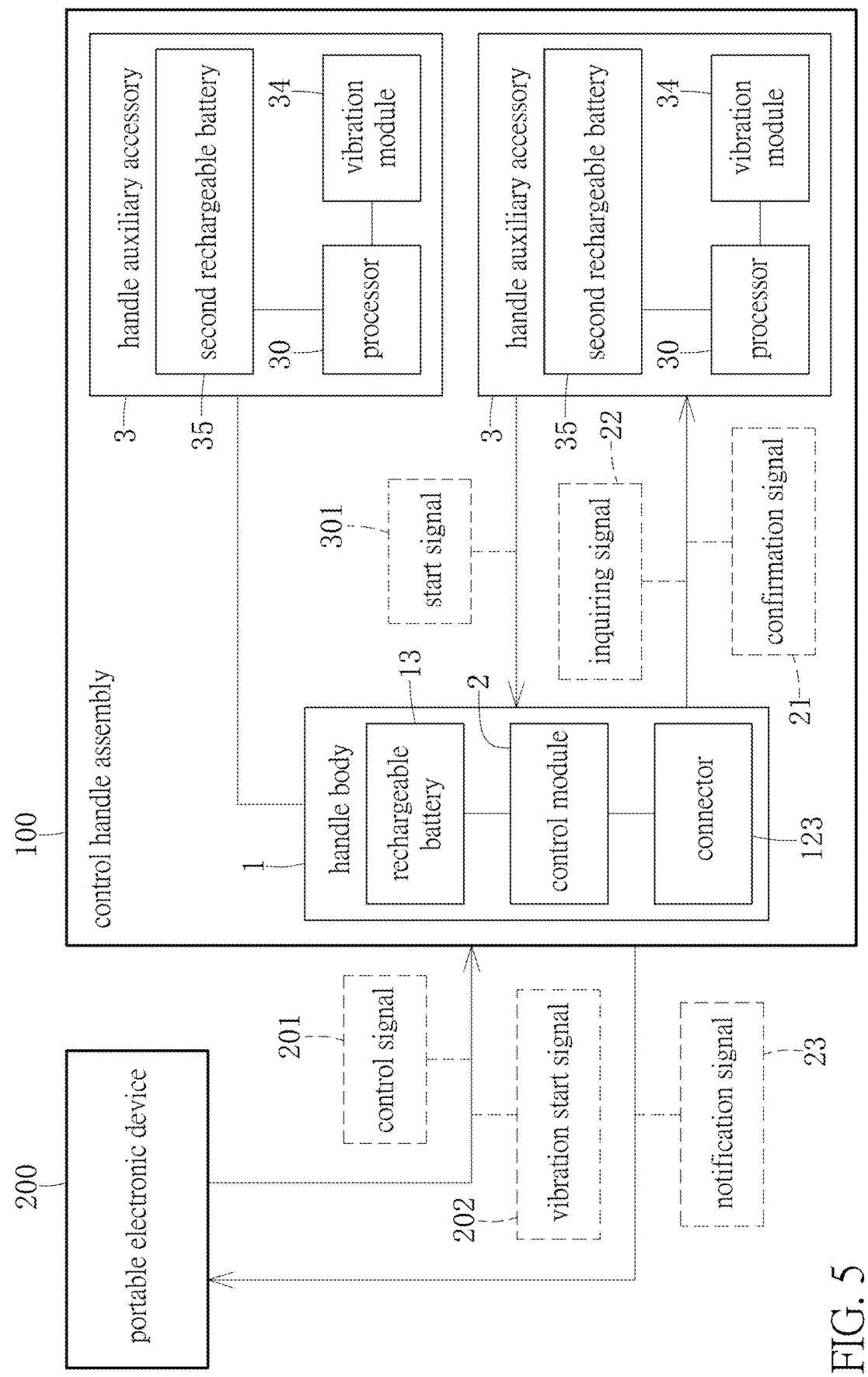
FIG. 5 is a schematic block diagram of the control handle assembly according to a first embodiment of the present disclosure.

Referring to FIG. 1 to FIG. 5, FIG. 1 is a schematic perspective view of a control handle assembly according to the present disclosure, FIG. 2 is a schematic perspective view of the control handle assembly from another perspective of FIG. 1, FIG. 3 is a schematic exploded view of the control handle assembly according to the present disclosure, FIG. 4 is a schematic exploded view of the control handle assembly from another perspective of FIG. 3, and FIG. 5 is a schematic block diagram of the control handle assembly according to a first embodiment of the present disclosure.

A control handle assembly 100 of present disclosure is used for holding a portable electronic device 200. The portable electronic device 200 can be a smartphone, a tablet, etc., but the present disclosure is not limited thereto.

The control handle assembly 100 includes a handle body 1, a control module 2, and two handle auxiliary accessories 3. The handle body 1 includes a connection mechanism 11 and two gripping parts 12. Two ends of the connection mechanism 11 are respectively connected to the two gripping parts 12, and the connection mechanism 11 and the two gripping parts 12 are configured to jointly hold the portable electronic device 200. The connection mechanism 11 is mainly used to connect the two gripping parts 12. Each of the two gripping parts 12 is grippable by a hand of a user.

In one of the embodiments, the connection mechanism 11 can only be used to connect the two gripping parts 12 and support the portable electronic device 200, and the connection mechanism 11 has no other function. In one of the embodiments, the connection mechanism 11 includes a middle fixing structure and two telescopic structures, one end of each of the two telescopic structures is connected to the middle fixing structure, another end of each of the two telescopic structures is connected to one of the two gripping parts 12, and at least one portion of each of the two telescopic structures can be operated to be folded into a corresponding one of the two gripping parts 12. In one of the embodiments, the connection mechanism 11 includes a pivot structure and two connecting arms, one end of each of the two connecting arms is connected to the pivot structure, another end of each of the two connecting arms is connected to one of the two gripping parts 12, each of the two gripping parts 12 can be operated to rotate relative to the pivot structure through the connecting arm, and the two gripping parts 12 are rotatable in a direction facing each other, thereby achieving ease of storage.

A side of each of the two gripping parts 12 includes a plurality of operation members 120 (which can be a button, a rocker, and a touch panel). A quantity, an arrangement position, and a type of the operation members 12 can be designed according to practical requirements, and are not limited by the drawings.

Another side of each of the two gripping parts 12 (i.e., a bottom surface of each of the two gripping parts 12) includes a first electrically connecting member 121 and at least one first connecting member 122. A quantity and an arrangement position of the first electrically connecting member 121 and the at least one first connecting member 122 that are included in any one of the two gripping parts 12 can be selected according to practical requirements, and are not limited by the drawings. For example, the first electrically connecting member 121 includes a set of pogo pins, gold fingers, etc. The at least one first connecting member 122 includes a first magnetic attraction unit 1221.

Each of the handle auxiliary accessories 3 includes a processor 30, an accessory body 31, a second electrically connecting structure 32, at least one second connecting member 33, and a vibration module 34. A quantity of the second electrically connecting structure 32 and the at least one second connecting member 33 that are included in each of the handle auxiliary accessories 3 corresponds to a quantity of the first electrically connecting member 121 and the at least one first connecting member 122 of each of the two gripping parts 12.

The processor 30 is disposed in the accessory body 31, and the processor 30 is electrically connected to the second electrically connecting structure 32 and the vibration module 34. The at least one second connecting member 33 is disposed on the accessory body 31, and the at least one second connecting member 33 and the at least one first connecting member 122 are detachably connected to each other. The accessory body 31 is fixed on another side of a corresponding one of the two gripping parts 12 through engagement between the at least one second connecting member 33 and the at least one first connecting member 122 of the corresponding gripping part 12.

The second electrically connecting structure 32 is disposed on the accessory body 31. The second electrically connecting structure 32 and the first electrically connecting member 121 are connected to each other. For example, the second electrically connecting structure 32 includes a set of pogo pins, gold fingers, etc. The at least one second connecting member 33 can include a second magnetic attraction unit 331 that is configured to be magnetic attracted with the first magnetic attraction unit 1221.

The vibration module 34 is disposed in the accessory body 31. When the at least one second connecting member 33 of each of the accessory bodies 31 and the at least one first connecting member 122 are connected to each other, and the second electrically connecting structure 32 and the first electrically connecting member 121 are connected to each other, the processor 30 is electrically connected to the control module 2 through the second electrically connecting structure 32 and the first electrically connecting member 121.

When the control module 2 is electrically connected to the processor 30, and the control module 2 is connected to the portable electronic device 200, the control module 2 is configured to control the vibration module 34 to vibrate through the processor 30 according to one or more control signals 201 of the portable electronic device 200. For example, the control module 2 is configured to control the vibration module 34 to vibrate at different frequencies and speeds through the processor 30 according to different control signals 201. More specifically, the vibration module 34 includes an eccentric motor, and the processor 30 is configured to control a rotation speed and a rotation time of the eccentric motor of the vibration module 34 according to the control signal 201, so as to allow the user to have different vibration experiences. Components that are included in the vibration module 34 and used to generate vibration are not limited to the eccentric motor. For example, the vibration module 34 can include a linear resonant actuator (LRA).

When the processor 30 is electrically connected to the control module 2, and the processor 30 obtains a power required for operation, the processor 30 can first transmit a start signal 301 to the control module 2. After the control module 2 receives the start signal 301, the control module 2 can recognize that the two handle auxiliary accessories 3 currently installed on the two gripping parts 12 have the vibration modules 34 therein.

In different embodiments, each of the handle auxiliary accessories 3 can include a rechargeable battery that is disposed in the accessory body 31, and the rechargeable battery is configured to provide a power required for an operation of the processor 30 and the vibration module 34.

In the embodiment where at least one of the handle auxiliary accessories 3 includes the rechargeable battery, the accessory body 31 can also include a switch 311. When the switch 311 is pressed by the user, the processor 30 and the vibration module 34 can obtain the power from the rechargeable battery. After the processor 30 is started, the processor 30 transmits the start signal 301 to the control module 2, and the control module 2 can send a confirmation signal 21 back to the processor 30 after receipt of the start signal 301. After the processor 30 receives the confirmation signal 21, the processor 30 can confirm that each of the accessory bodies 31 is installed on one of the gripping parts 12, and the first electrically connecting member 121 is connected to the second electrically connecting structure 32. Correspondingly, if the processor 30 does not receive the confirmation signal 21 within a predetermined time after transmission of the start signal 301, the processor 30 determines that each of the accessory bodies 31 is not installed on one of the gripping parts 12, and the processor 30 can switch to a sleep mode after a waiting time.

A connector 123 can be disposed on a side of one of the two gripping parts 12 that faces toward another one of the two gripping parts 12, and the connector 123 is electrically connected to the control module 2. The connector 123 is used to mate with a mating connector of the portable electronic device 200. When the connector 123 and the mating connector of the portable electronic device 200 are mated with each other, the control module 2 can transmit an inquiring signal 22 through each of the first electrically connecting members 121. If the control module 2 does not receive the start signal 301 that is returned by the processor 30 within a predetermined time, the control module 2 determines that each of the two gripping parts 12 is not connected to the handle auxiliary accessory 3. Correspondingly, if the control module 2 receives the start signal 301, the control module 2 determines that each of the two gripping parts 12 is connected to the handle auxiliary accessory 3, and the control module 2 can record that each of the handle auxiliary accessories 3 includes the vibration module 34. When the processor 30 receives the inquiring signal 22, the processor 30 sends the start signal 301 back to the control module 2.

When the control module 2 confirms that the handle auxiliary accessories 3 is disposed on the gripping part 12, and the handle auxiliary accessory 3 includes the vibration module 34, the control module 2 can transmit a notification signal 23 to the portable electronic device 200. After receiving the notification signal 23, the portable electronic device 200 can timely transmit the control signal 201 to the control module 2 according to an application program that is operated by the portable electronic device 200.

In practice, the portable electronic device 200 can include an operation interface, and the operation interface can have a vibration option. Texts similar to "turn on vibration" can be displayed around the vibration option in the operation interface, so as to prompt the user whether or not to turn on the vibration function. When the vibration option is selected by the user, the portable electronic device 200 can transmit a vibration start signal 202 to the control module 2, and the control module 2 transmits the inquiring signal 22 to the processor 30. If the control module 2 receives the start signal 301 that is returned by the processor 30 after transmission of the inquiring signal 22, the control module 2 can transmit the notification signal 23 to the portable electronic device 200. If the control module 2 does not receive the start signal 301 that is returned by the processor 30 after transmission of the inquiring signal 22, the control module 2 refrains from transmitting the notification signal 23 to the portable electronic device 200, or the control module 2 transmits an unsupported signal to the portable electronic device 200. If the portable electronic device 200 does not receive the notification signal 23 or receives the unsupported signal, the portable electronic device 200 will not transmit the control signal 201 to the control module 2 according to the application program that is executed by the portable electronic device 200.

Based on the above, by including the processor 30 and the vibration module 34 in the handle auxiliary accessory 3, the user only needs to simply install the accessory body 31 on the gripping part 12, and the handle body 1 can have the vibration function. In this way, when the user uses the handle body 1, a better use experience can be obtained.

It is worth mentioning that, in one variation of the present embodiment, the rechargeable battery that is disposed in the handle body 1 is defined as a first rechargeable battery 13. Each of the accessory bodies 31 includes a second rechargeable battery 35. The first rechargeable battery 13 serves as a power source for an operation of the control module 2. When the processor 30 is electrically connected to the control module 2, the power required for the operation of the processor 30 and the vibration module 34 is first drawn from the second rechargeable battery 35. The processor 30 and the vibration module 34 only use the first rechargeable battery 13 when an electrical quantity of the second rechargeable battery 35 is lower than a predetermined electrical quantity.

More specifically, the processor 30 is configured to obtain an electrical quantity of the first rechargeable battery 13 and the electrical quantity of the second rechargeable battery 35. When the processor 30 is electrically connected to the control module 2, the processor 30 can first read the electrical quantity of the first rechargeable battery 13 and the electrical quantity of the second rechargeable battery 35, and the processor 30 is configured to determine whether or not the electrical quantity of the second rechargeable battery 35 is lower than the predetermined electrical quantity. If the processor 30 determines that the electrical quantity of the second rechargeable battery 35 is lower than the predetermined electrical quantity, the processor 30 can use the first rechargeable battery 13 as a main power source required for the operation of the processor 30 and the vibration module 34. If the processor 30 determines that the electrical quantity of the second rechargeable battery 35 is greater than the predetermined electrical quantity, the processor 30 can use the second rechargeable battery 35 as the main power source required for the operation of the processor 30 and the vibration module 34. Through the above design, the processor 30 and the vibration module 34 can be prevented from quickly consuming the power of the first rechargeable battery 13.

In different embodiments, the control module 2, the processor 30, and the vibration module 34 can preferentially use the first rechargeable battery 13 as the power source, and only use the second rechargeable battery 35 as the power source when the electrical quantity of the first rechargeable battery 13 is lower than a predetermined basic quantity. That is to say, the second rechargeable battery 35 can be used as a backup battery. If the processor 30 uses the first rechargeable battery 13 as the power source, the processor 30 can read the electrical quantity of the first rechargeable battery 13 every predetermined time interval, and determine whether or not the electrical quantity of the first rechargeable battery 13 is lower than the predetermined basic quantity. If the processor 30 determines that the electrical quantity of the first rechargeable battery 13 is lower than the predetermined basic quantity, the processor 30 can use the second rechargeable battery 35 as the power source required for its operation instead, such that the vibration module 34 also uses the second rechargeable battery 35 as the power source required for its operation.

Figure 6:
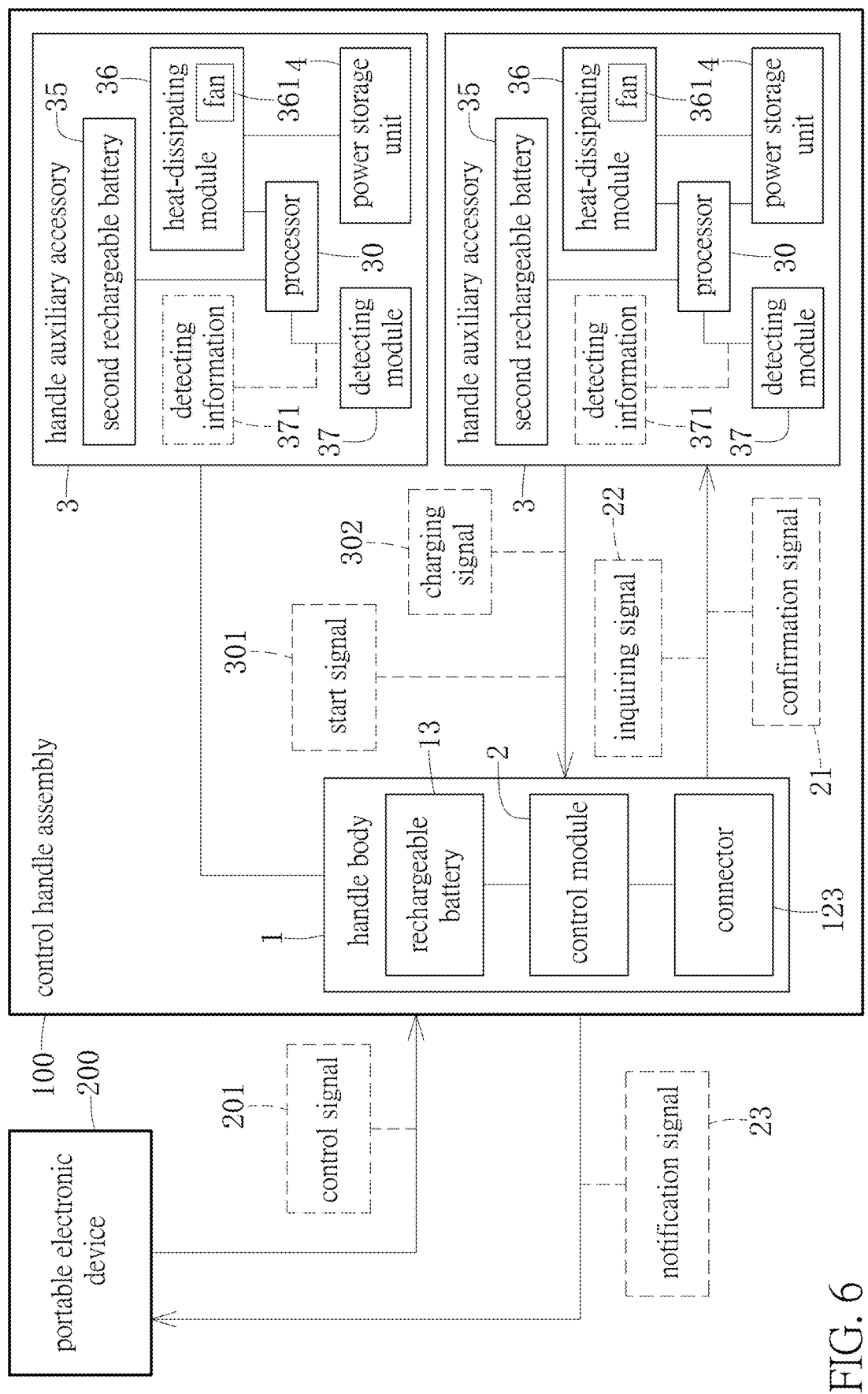
FIG. 6 is a schematic block diagram of the control handle assembly according to a second embodiment of the present disclosure.

Reference is made to FIG. 6, which is a schematic block diagram of the control handle assembly according to a second embodiment of the present disclosure. The present embodiment is mainly different from the above-mentioned embodiment in that each of the handle auxiliary accessories 3 of the control handle assembly 100 includes a heat-dissipating module 36, and does not include the vibration module 34. The heat-dissipating module 36 is disposed in the accessory body 31. The heat-dissipating module 36 can be a fan or a refrigeration chip.

When each of the accessory bodies 31 is fixed on another side of one of the gripping parts 12 through connection between the at least one second connecting member 33 and the at least one first connecting member 122, the first electrically connecting member 121 and the second electrically connecting structure 32 are connected to each other, the control module 2 is electrically connected to the heat-dissipating module 36, and the control module 2 is configured to start the heat-dissipating module 36 for reducing a temperature of the accessory body 31.

In practice, each of the accessory bodies 31 can include a detecting module 37, the detecting module 37 is disposed in the accessory body 31, and the detecting module 37 detects the temperature of the accessory body 31 to generate a detecting information 371. The detecting module 37 is configured to transmit the detecting information 371 to the processor 30, and the processor 30 determines whether or not the temperature of the accessory body 31 is greater than a predetermined temperature according to the detecting information 371. If the processor 30 determines that the temperature of the accessory body 31 is greater than the predetermined temperature, the processor 30 is configured to control starting of the heat-dissipation module 36. The detecting module 37 can be a temperature sensor or any electronic component that can be used to sense a temperature.

In different embodiments, the detecting module 37 can also be used to detect whether or not the accessory body 31 is gripped for generation of the detecting information 371. When the processor 30 determines that the accessory body 31 has been gripped for more than a predetermined time according to the detecting information 371, the processor 30 is configured to start the heat-dissipation module 36. The detecting module 37 can be a pressure sensor, a capacitive sensor, or any sensing component that can be used to sense whether or not the user is gripping the accessory body 31.

In practice, the control handle assembly 100 includes at least one power storage unit 4 that is disposed in the accessory body 31, but the present disclosure is not limited thereto. In different embodiments, the at least one power storage unit 4 can also be disposed in the handle body 1. The power storage unit 4 is configured to store the power. The power storage unit 4 can be a super capacitor. The heat-dissipating module 36 includes a fan 361, and the processor 30 is electrically connected to the fan 361. When the processor 30 is configured to start the heat-dissipating module 36, the processor 30 is configured to use the power that is stored in the power storage unit 4 to start the fan 361.

A conventional portable electronic device (e.g., a smartphone and a tablet) is designed with a current limiting mechanism, so as to prevent related electronic components thereof from being damaged by instantaneous high currents. When the fan 361 is being started, a high current is instantly required. If the power source required to start the fan 361 is provided by the portable electronic device 200, the current limiting mechanism of the portable electronic device 200 can be triggered during starting of the fan 361, thereby preventing the fan 361 from being smoothly started.

The control handle assembly 100 of the present embodiment uses the design of the power storage unit 4, such that the power required to start the fan 361 comes from the power storage unit 4 rather than from the portable electronic device 200. Therefore, the fan 361 can be started smoothly.

In an example where the power storage unit 4 is provided in the accessory body 31, when the processor 30 is electrically connected to the control module 2 through the second electrically connecting structure 32 and the first electrically connecting member 121, the processor 30 can automatically detect an electrical quantity of the power storage unit 4. When the processor 30 determines that the electrical quantity of the power storage unit 4 is lower than a predetermined electrical quantity, the processor 30 transmits a charging signal 302 to the control module 2. The control module 2 receives the charging signal 302, and the control module 2 enables the portable electronic device 200 or the rechargeable battery to charge the power storage unit 4.

Based on the above, by designing the accessory body 31 to include the heat-dissipating module 36, palms of the user are less likely to sweat (due to a high temperature) when the control handle assembly 100 is gripped by the user. In the related art, for the control handle assembly that is used to hold the smartphone or the tablet, the fan is provided only to assist the smartphone or the tablet in dissipating heat, and no fan is provided to assist the palms of the user in dissipating heat. Therefore, for the user who is prone to having sweaty palms, the palms are easily covered in sweat after the control handle assembly is held for a period of time. When the palms of the user start to sweat, the user will have difficulty in holding the control handle assembly.

Figure 7:
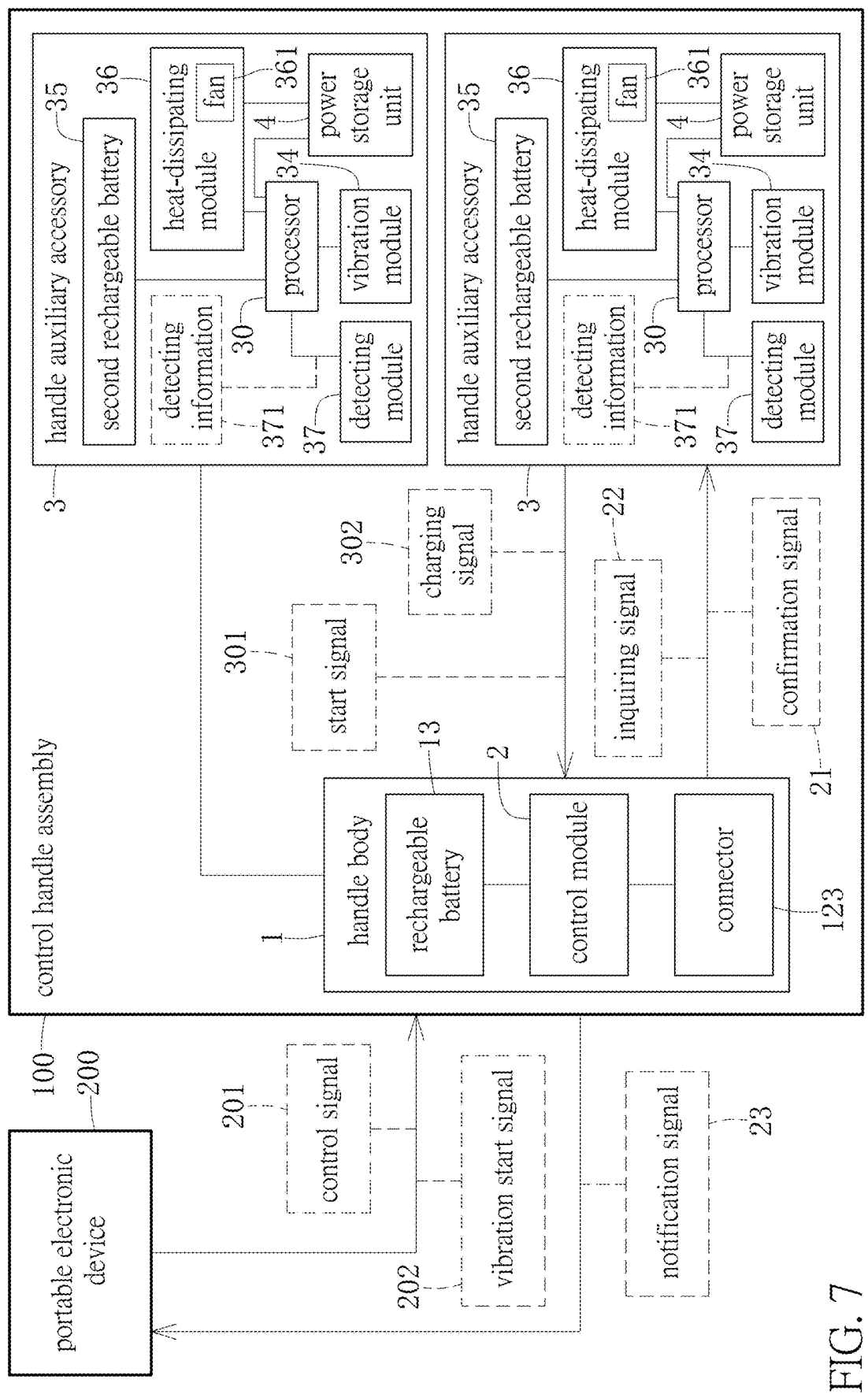
FIG. 7 is a schematic block diagram of the control handle assembly according to a third embodiment of the present disclosure.

Reference is made to FIG. 7, which is a schematic block diagram of the control handle assembly according to a third embodiment of the present disclosure. In the above first embodiment, the control handle assembly 100 is exemplified to only include the vibration module 34 and omit the heat-dissipating module 36. In the second embodiment, the control handle assembly 100 is exemplified to only include the heat-dissipating module 36 and omit the vibration module 34. In the present embodiment, the control handle assembly 100 is exemplified to include both the vibration module 34 and the heat-dissipating module 36. The operation manners of the vibration module 34 and the heat-dissipation module 36 are already illustrated in the above description, and will not be reiterated herein for sake of brevity.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A control handle assembly for holding a portable electronic device, comprising:
   a handle body including a connection mechanism and two gripping parts, wherein two ends of the connection mechanism are connected to the two gripping parts, and the connection mechanism and the two gripping parts are configured to jointly hold the portable electronic device; wherein a plurality of operation members are disposed on one side of each of the two gripping parts, and a first electrically connecting member and at least one first connecting member are disposed on another side of each of the two gripping parts;
   a control module disposed in the handle body; and
   two handle auxiliary accessories, wherein each of the two handle auxiliary accessories includes:
      an accessory body;
      at least one second connecting member disposed on the accessory body, wherein the at least one second connecting member and the at least one first connecting member are detachably connected to each other;
      a second electrically connecting structure disposed on the accessory body; and
      a vibration module disposed in the accessory body and electrically connected to the second electrically connecting structure;
      wherein, in each of the two handle auxiliary accessories, when the at least one second connecting member and the at least one first connecting member are connected to each other, and the second electrically connecting structure and the first electrically connecting member are connected to each other, the vibration module is electrically connected to the control module through the second electrically connecting structure and the first electrically connecting member;
   wherein, when the control module is electrically connected to the vibration module of each of the two handle auxiliary accessories, and the control module is connected to the portable electronic device, the control module is configured to control the vibration module of each of the two handle auxiliary accessories to vibrate according to a control signal that is transmitted by the portable electronic device.

2. The control handle assembly according to claim 1, wherein each of the two handle auxiliary accessories of the control handle assembly includes a heat-dissipating module that is disposed in the accessory body; wherein, when the first electrically connecting member and the second electrically connecting structure of each of the two handle auxiliary accessories are connected to each other, the control module or a processor that is disposed in the accessory body is electrically connected to the heat-dissipating module, and the control module is configured to start the heat-dissipating module for reducing a temperature of the accessory body.

3. The control handle assembly according to claim 2, further comprising at least one power storage unit, wherein the at least one power storage unit is disposed in the handle body or the accessory body, and the heat-dissipating module includes a fan; wherein, when the control module or the processor is operated to start the heat-dissipating module, the control module or the processor is configured to start the fan by using a power that is stored in the at least one power storage unit.

4. The control handle assembly according to claim 3, wherein the at least one first connecting member includes a first magnetic attraction unit, the at least one second connecting member includes a second magnetic attraction unit, and the first magnetic attraction unit and the second magnetic attraction unit are configured to be magnetically attracted to each other; wherein the at least one power storage unit is a super capacitor.

5. The control handle assembly according to claim 3, wherein, when the heat-dissipating module is electrically connected to the control module through the second electrically connecting structure of each of the two handle auxiliary accessories and the first electrically connecting member, the processor is configured to detect an electrical quantity of the at least one power storage unit; wherein, when the processor determines that the electrical quantity of the at least one power storage unit is lower than a predetermined electrical quantity, the processor transmits a charging signal to the control module; wherein, when the control module receives the charging signal, the control module enables the portable electronic device to charge the at least one power storage unit, or the control module enables a rechargeable battery that is disposed in the handle body to charge the at least one power storage unit.

6. The control handle assembly according to claim 2, wherein each of the two handle auxiliary accessories includes a detecting module that is configured to detect the temperature of the accessory body for generation of detecting information; wherein, when the processor determines that the temperature of the accessory body of at least one of the two handle auxiliary accessories is greater than a predetermined temperature according to the detecting information, the processor is configured to start the heat-dissipation module.

7. The control handle assembly according to claim 2, wherein each of the two handle auxiliary accessories includes a detecting module that is configured to detect whether or not the accessory body is gripped for generation of detecting information; wherein, when the processor determines that the accessory body of at least one of the two handle auxiliary accessories is gripped for more than a predetermined time according to the detecting information, the processor is configured to start the heat-dissipation module.

8. The control handle assembly according to claim 1, wherein the handle body includes a first rechargeable battery, the accessory body of each of the two handle auxiliary accessories includes a second rechargeable battery and a processor, and the processor is electrically connected to the vibration module; wherein, in each of the two handle auxiliary accessories, when the processor is electrically connected to the control module through the second electrically connecting structure and the first electrically connecting member, the processor detects an electrical quantity of the first rechargeable battery; wherein, in each of the two handle auxiliary accessories, when the processor determines that the electrical quantity of the first rechargeable battery is lower than a predetermined electrical quantity, the processor is configured to control the second rechargeable battery to be a power source, so as to enable the vibration module to use the second rechargeable battery as the power source.

9. A control handle assembly for holding a portable electronic device, comprising:
a handle body including a connection mechanism and two gripping parts, wherein two ends of the connection mechanism are connected to the two gripping parts, and the connection mechanism and the two gripping parts are configured to jointly hold the portable electronic device; wherein a plurality of operation members are disposed on one side of each of the two gripping parts, and a first electrically connecting member and at least one first connecting member are disposed on another side of each of the two gripping parts;
a control module disposed in the handle body; and
two handle auxiliary accessories, wherein each of the two handle auxiliary accessories includes:
an accessory body;
at least one second connecting member disposed on the accessory body, wherein the at least one second connecting member and the at least one first connecting member are detachably connected to each other;
a second electrically connecting structure disposed on the accessory body; and
a heat-dissipating module disposed in the accessory body and electrically connected to the second electrically connecting structure;
wherein, in each of the two handle auxiliary accessories, when the at least one second connecting member and the at least one first connecting member are connected to each other, and the second electrically connecting structure and the first electrically connecting member are connected to each other, the heat-dissipating module is electrically connected to the control module through the second electrically connecting structure and the first electrically connecting member;
wherein, when the control module is connected to the heat-dissipating module of each of the two handle auxiliary accessories, and the control module is connected to the portable electronic device, the control module is configured to start the heat-dissipating module of each of the two handle auxiliary accessories, so that a temperature of the accessory body is lower than or equal to a predetermined temperature.

10. The control handle assembly according to claim 9, further comprising at least one power storage unit, wherein the at least one power storage unit is disposed in the handle body or the accessory body, and the heat-dissipating module includes a fan; wherein, when the control module or a processor of the accessory body is operated to start the heat-dissipating module, the control module or the processor is configured to start the fan by using a power that is stored in the at least one power storage unit.

11. The control handle assembly according to claim 10, wherein the at least one first connecting member includes a first magnetic attraction unit, the at least one second connecting member includes a second magnetic attraction unit, and the first magnetic attraction unit and the second magnetic attraction unit are configured to be magnetically attracted to each other; wherein the at least one power storage unit is a super capacitor.

12. The control handle assembly according to claim 10, wherein, when the heat-dissipating module is electrically connected to the control module through the second electrically connecting structure of each of the two handle auxiliary accessories and the first electrically connecting member, the processor is configured to detect an electrical quantity of the at least one power storage unit; wherein, when the processor determines that the electrical quantity of the at least one power storage unit is lower than a predetermined electrical quantity, the processor transmits a charging signal to the control module; wherein, when the control module receives the charging signal, the control module enables the portable electronic device to charge the at least one power storage unit, or the control module enables a rechargeable battery that is disposed in the handle body to charge the at least one power storage unit.

13. The control handle assembly according to claim 9, wherein each of the two handle auxiliary accessories includes a detecting module and a processor, and the detecting module and the processor are disposed in the accessory body; wherein the detecting module is configured to detect the temperature of the accessory body for generation of detecting information; wherein, when the processor determines that the temperature of the accessory body of at least one of the two handle auxiliary accessories is greater than a predetermined temperature according to the detecting information, the processor is configured to start the heat-dissipation module.

14. The control handle assembly according to claim 9, wherein each of the two handle auxiliary accessories includes a detecting module and a processor, and the detecting module and the processor are disposed in the accessory body; wherein the detecting module is configured to detect whether or not the accessory body is gripped for generation of detecting information; wherein, when the processor determines that the accessory body of each of the two handle auxiliary accessories is gripped for more than a predetermined time according to the detecting information, the processor is configured to start the heat-dissipation module.

15. The control handle assembly according to claim 9, wherein the handle body includes a first rechargeable battery, the accessory body of each of the two handle auxiliary accessories includes a second rechargeable battery and a processor, and the processor is electrically connected to the heat-dissipating module; wherein, in each of the two handle auxiliary accessories, when the processor is electrically connected to control module through the second electrically connecting structure and the first electrically connecting member, the processor detects an electrical quantity of the first rechargeable battery; wherein, in each of the two handle auxiliary accessories, when the processor determines that the electrical quantity of the first rechargeable battery is lower than a predetermined electrical quantity, the processor is configured to control the second rechargeable battery to be a power source, so as to enable the heat-dissipating module to use the second rechargeable battery as the power source.

* * * * *